(12) United States Patent
Macieira et al.

(10) Patent No.: US 11,496,368 B2
(45) Date of Patent: *Nov. 8, 2022

(54) DYNAMICALLY IDENTIFYING CRITICALITY OF SERVICES AND DATA SOURCES

(71) Applicant: McAfee, LLC, San Jose, CA (US)

(72) Inventors: Thiago J. Macieira, Portland, OR (US); Ned M. Smith, Beaverton, OR (US); Zheng Zhang, Portland, OR (US); John Teddy, Butte, MT (US); Arthur S. Zeigler, Santa Clara, CA (US)

(73) Assignee: MCAFEE, LLC, San Jose, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/013,361

(22) Filed: Sep. 4, 2020

(65) Prior Publication Data

US 2020/0403878 A1    Dec. 24, 2020

Related U.S. Application Data (63) Continuation of application No. 15/278,275, filed on Sep. 28, 2016, now Pat. No. 10,944,636.

(51) Int. Cl.
*H04L 41/12* (2022.01)
*H04L 41/0853* (2022.01)
(Continued)

(52) U.S. Cl.
CPC ............ *H04L 41/12* (2013.01); *H04L 41/065* (2013.01); *H04L 41/0853* (2013.01);
(Continued)

(58) Field of Classification Search
CPC ....... H04L 41/12; H04L 45/02; H04W 40/248
See application file for complete search history.

(56) References Cited

U.S. PATENT DOCUMENTS 9,166,692 B1    10/2015    Felderman et al.
9,497,639 B2    11/2016    Meshkati et al.
(Continued)

FOREIGN PATENT DOCUMENTS

CN    101010880    8/2007
CN    101204042    6/2008
(Continued)

OTHER PUBLICATIONS

European Patent Office, "Communication under Rule 71(3) EPC," issued in connection with European Patent Application No. 17785090.6, dated May 7, 2020, 8 pages.
(Continued)

*Primary Examiner* — Elton Williams
(74) *Attorney, Agent, or Firm* — Hanley, Flight & Zimmerman, LLC (57) ABSTRACT

A method, a computer-readable medium, and a device for dynamically identifying criticality of services and data sources. The computer-readable medium comprising instructions which, when executed, cause a programmable device to: determine, based on a plurality of service-related metrics from a network node, upstream network nodes and downstream network nodes in a network; query the upstream network nodes and the downstream network nodes with a multicast request for an additional plurality of service-related metrics; extrapolate a current network topology based on the plurality of service-related metrics and the additional plurality of service-related metrics; determine whether or not an upstream backup server is present for the network node; determine a set of critical service delivery points in the network based on the determination of the upstream backup server; and generate a network service alert responsive to a service interruption from the set of critical service delivery points.

20 Claims, 7 Drawing Sheets

(51) Int. Cl.
  *H04L 43/08* (2022.01)
  *H04L 41/5009* (2022.01)
  *H04L 41/0631* (2022.01)
  *H04L 67/51* (2022.01)
  *H04L 41/0659* (2022.01)

(52) U.S. Cl.
  CPC .......... *H04L 41/5009* (2013.01); *H04L 43/08* (2013.01); *H04L 67/51* (2022.05); *H04L 41/0659* (2013.01)

(56) References Cited

U.S. PATENT DOCUMENTS

| | | | |
|---|---|---|---|
| 10,944,636 | B2* | 3/2021 | Macieira ................ H04L 67/16 |
| 2004/0059807 | A1 | 3/2004 | Klotz et al. |
| 2005/0213514 | A1 | 9/2005 | Su et al. |
| 2009/0024549 | A1 | 1/2009 | Johnson |
| 2011/0116387 | A1 | 5/2011 | Beeco et al. |
| 2013/0163407 | A1 | 6/2013 | Sinha et al. |
| 2018/0091374 | A1 | 3/2018 | Macieira et al. |

FOREIGN PATENT DOCUMENTS

| | | |
|---|---|---|
| CN | 101529869 | 9/2009 |
| CN | 105553749 | 5/2016 |
| CN | 105704735 | 6/2016 |
| CN | 109983735 | 7/2019 |
| EP | 3520325 | 10/2020 |

OTHER PUBLICATIONS

International Searching Authority, "Search Report and Written Opinion," issued in connection with International Patent Application No. PCT/US2017/054140, dated Dec. 5, 2017, 15 pages.

United States Patent and Trademark Office, "Non-Final Office Action," issued in connection with U.S. Appl. No. 15/278,275, dated Mar. 6, 2019, 32 pages.

United States Patent and Trademark Office, "Advisory Action," issued in connection with U.S. Appl. No. 15/278,275, dated Nov. 5, 2019, 6 pages.

United States Patent and Trademark Office, "Final Office Action," issued in connection with U.S. Appl. No. 15/278,275, dated Aug. 15, 2019, 33 pages.

United States Patent and Trademark Office, "Non-Final Office Action," issued in connection with U.S. Appl. No. 15/278,275, dated Dec. 12, 2019, 38 pages.

United States Patent and Trademark Office, "Final Office Action," issued in connection with U.S. Appl. No. 15/278,275, dated Sep. 19, 2018, 23 pages.

United States Patent and Trademark Office, "Non-Final Office Action," issued in connection with U.S. Appl. No. 15/278,275, dated Mar. 29, 2018, 27 pages.

United States Patent and Trademark Office, "Notice of Allowance," issued in connection with U.S. Appl. No. 15/278,275, dated Jun. 4, 2020, 36 pages.

The State Intellectual Property Office of People's Republic of China, "First Office Action," issued in connection with Chinese Patent Application No. 201780067909.0, dated Aug. 4, 2021, 26 pages (English translation provided).

China National Intellectual Property Administration, "Notice of Decision of Granting Patent Right," issued in connection with Chinese Patent Application No. 201780067909.0, dated Jan. 21, 2022, 5 pages.

* cited by examiner

DYNAMICALLY IDENTIFYING CRITICALITY OF SERVICES AND DATA SOURCES

RELATED APPLICATION

This patent arises from a continuation of U.S. patent application Ser. No. 15/278,275, (now U.S. Pat. No. 10,944, 636), which was filed on Sep. 28, 2016. U.S. patent application Ser. No. 15/278,275 is hereby incorporated herein by reference in its entirety. Priority to U.S. patent application Ser. No. 15/278,275 is hereby claimed.

TECHNICAL FIELD

Embodiments described herein generally relate to electronic device networking and specifically to Internet of Things (IoT) devices in a network.

BACKGROUND ART

Computer networks support the delivery of services. Services consist of the front end with which the user interfaces, as well as the backend data processing and the supporting infrastructure to present data to the user. In networks, services traditionally are implemented with well-defined communication mechanisms. Often the communication mechanisms are implemented with standards-based protocols or proprietary protocols, both designed to facilitate the efficient movement of data from one device to another. A problem with monitoring the services is that they are difficult to discern. Often they are identified by the ports on which they operate, as well as the data messages themselves. This requires any application attempting to monitor services to either have prior knowledge of the service or to provide computationally expensive deep packet inspection. Additionally, adding a layer of encryption for security further makes the monitoring of a service in a network problematic.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

Collectively, small internetworked devices are called the Internet of things (IoT). Devices that comprise the IoT may include but are not limited to small single-purpose networked sensors, or they can be as full general purpose computers. The IoT may also include networked mobile computing devices, networked attached storage, and network-enabled services. IoT devices are often designed in support of a service. A service is a desired functionality for a user. For example, in smart home systems, a set of services may include light control, air conditioning control, smoke and fire detection, and security control.

To support the deployment of light weight small single-purpose networked devices, common operating system (OS) distributions have been developed. Zephyr™ (Zephyr is a trademark of the Linux Foundation of San Francisco, Calif.) is one implementation of a bundled OS as well as software tools and utilities. These common OS distributions often are designed for supporting functionality higher in the software stack.

Figure 1:
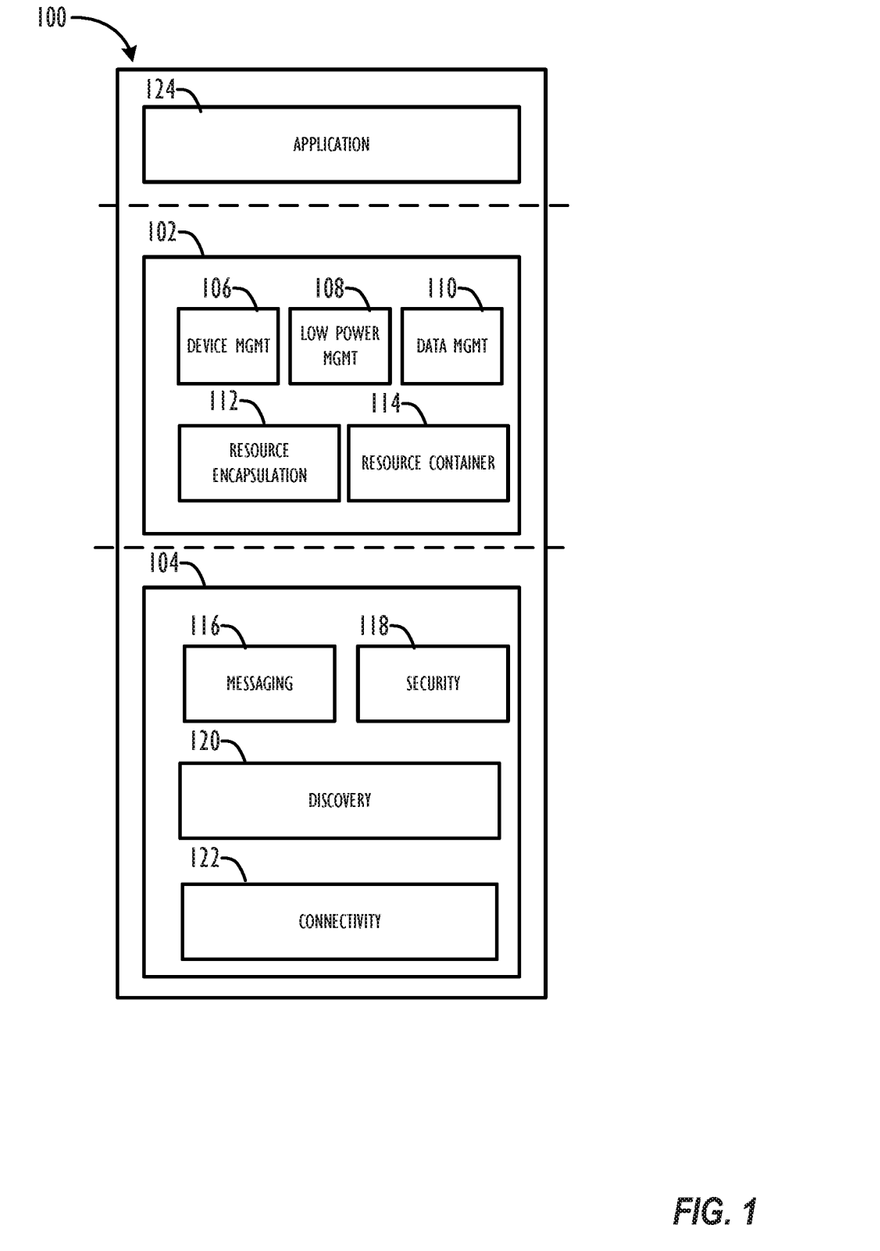
FIG. 1 is a block diagram of a software stack to support IoT device networking.

FIG. 1 is a block diagram of a software stack 100 to support IoT device networking. One example of a software stack for IoT devices is IoTivity® (IoTivity is a registered trademark of Samsung Electronics Co., of the Republic of Korea). IoTivity is an open source project between numerous IoT device manufacturers with the goal of providing a standardized software stack for communication between IoT devices and IoT infrastructure. The example presented in FIG. 1 is based on IoTivity. However, IoTivity is not required to practice the invention. Any software stack that supports IoT device networking may be used to implement the invention. The software stack may be implemented in any programming language operable to implement functionality to enable the behavior described below. Examples of programming languages include object oriented languages such as C++, Java® (Java is a register trademark of Oracle Corporation of Redwood City, Calif.), and C#, as well as procedural languages such as C and Fortran.

The application service stack 102 builds upon the base-layer stack 104. The application service stack 102 provides most of the functionality for application layer 124 functionality. The application service stack 102 includes an application programming interface (API) common to all IoT devices utilizing this software stack. This enables all IoT devices to use a common service framework for varying devices as well as providing standardized interfaces for applications. Support modules for the service stack 102 include resource encapsulation 112 and resource container 114. These modules provide the necessary software support to identify resources utilized for a given service as there may be many resources available on a network supporting different services.

Built upon the resource encapsulation 112 and resource container 114 modules are modules that include device management 106, low power management 108 and data management 110 modules. These modules offer high-level support of the resource encapsulation 112 and resource container 114 modules, logically organizing functionality into the device management 106, low power management 108, and data management 110. A base stack 104 supports the service stack 102. The base stack 104 is the lowest level of the software stack 100 to support IoT devices. For lightweight devices with limited computing resources, the utilization of the base stack 104 without the service stack 102 may be desirable. The base stack 104 abstracts fundamental operations into logical modules including a connectivity module 122, a discovery module 120, a messaging module 116 and a security module 118. Similar to the service stack 102, the base stack 104 provides an API to access the functionality of those modules. The base stack 104 abstracts connection oriented mechanisms into a more simplified functional implementation such as manipulating sockets, connections, and security parameters. This structure of base stack 104 and application service stack 102 is illustrative and by way of example only, and other software stacks may be used as desired.

The device management 106 module may provide interfaces to discovery functionality based on service. For example, an application 124 may be able to interface with the device management 106 module through software classes. The classes may implement a method call that functionally specifies a particular service and multicasts it through the network. Code example 1 demonstrates accessing this class method utilizing an OCPlatform class and the findResources( ) method:
OCPlatform platform;
platform.findResources(" ",
"coap://192.168.0.103/oc/core?rt=alpha.light", findHandler);

The arguments define the target devices, as well as the service. Upon receipt of the multicast message generated by code example 1, receiving devices may respond to the sender to notify the sender of the specified service support.

Figure 2:
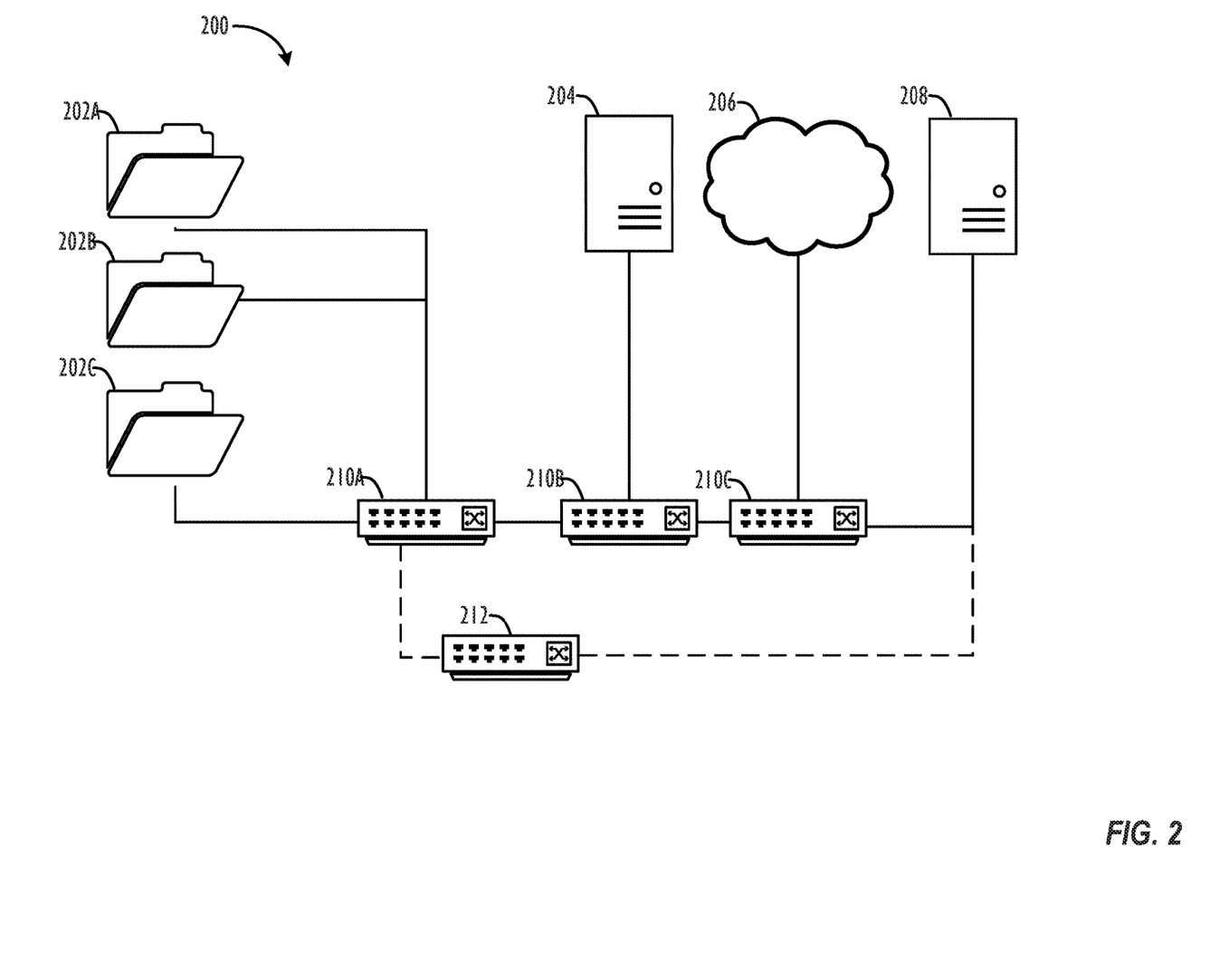
FIG. 2 is a block diagram illustrating an IoT device network according to one or more embodiment.

FIG. 2 is a block diagram illustrating an IoT network 200 according to one or more embodiment. The IoT network 200 illustrated in FIG. 2 includes a plurality of data sources 202A, 202B, 202C. The plurality of data sources may take the form of edge devices. Edge devices are electronic devices and may include but are not limited to simple lightweight data collecting devices that provide input or output to users. The devices may include but are not limited to single-purpose input devices such as cameras, microphones, thermometers, and accelerometers. Likewise, the devices may include but are not limited to single purpose output devices such as liquid crystal displays, light emitting diodes, and speaker systems. Devices may fill multipurpose roles and include input and output functionality in many different combinations as well.

The data sources 202A, 202B, 202C are connected to the network through switches 210A, 210B, 210C. These switches 210A, 210B, 210C provide packet switching in the network for providing data from the data sources 202A, 202B, 202C to data consumers. Switches may be deployed in a number of fashions including redundancy switches 212. The redundancy switch 212 establishes a backup networking link from a primary switch to a data source or another switch in the event of a network event including network failure. The number of switches 210 and the connections between switches 210 and other elements of FIG. 2 are illustrative and by way of example only, and other numbers of switches 210 and connectivity via the switches 210 may be used as desired. While described here through wired networking embodiments, these features may be implemented in a wireless manner, or a combination or wired and wireless networking elements.

An intermediate server 204 collects data provided by the data sources 202A, 202B, 202C through the switches 210A, 210B. The intermediate server 204 may process the data received from the data sources 202A, 202B, 202C. In this example, the data may be transported then across the network to a cloud-based system 206. The cloud-based system 206 may then augment the data from third party data sources, or continue processing the data in a similar manner to the processing performed by the intermediate server 204. Eventually, the data from the data sources 202A, 202B, 202C flows to a user-visible service server 208. This server utilizes the data provided by the data sources 202A, 202B, 202C and transforms that data into something meaningful to the user or consumer. For network robustness, redundancy switches 212 connect a backup link to the user-visible service server 208 in the event of failure of switches 210B and 210C.

Figure 3:
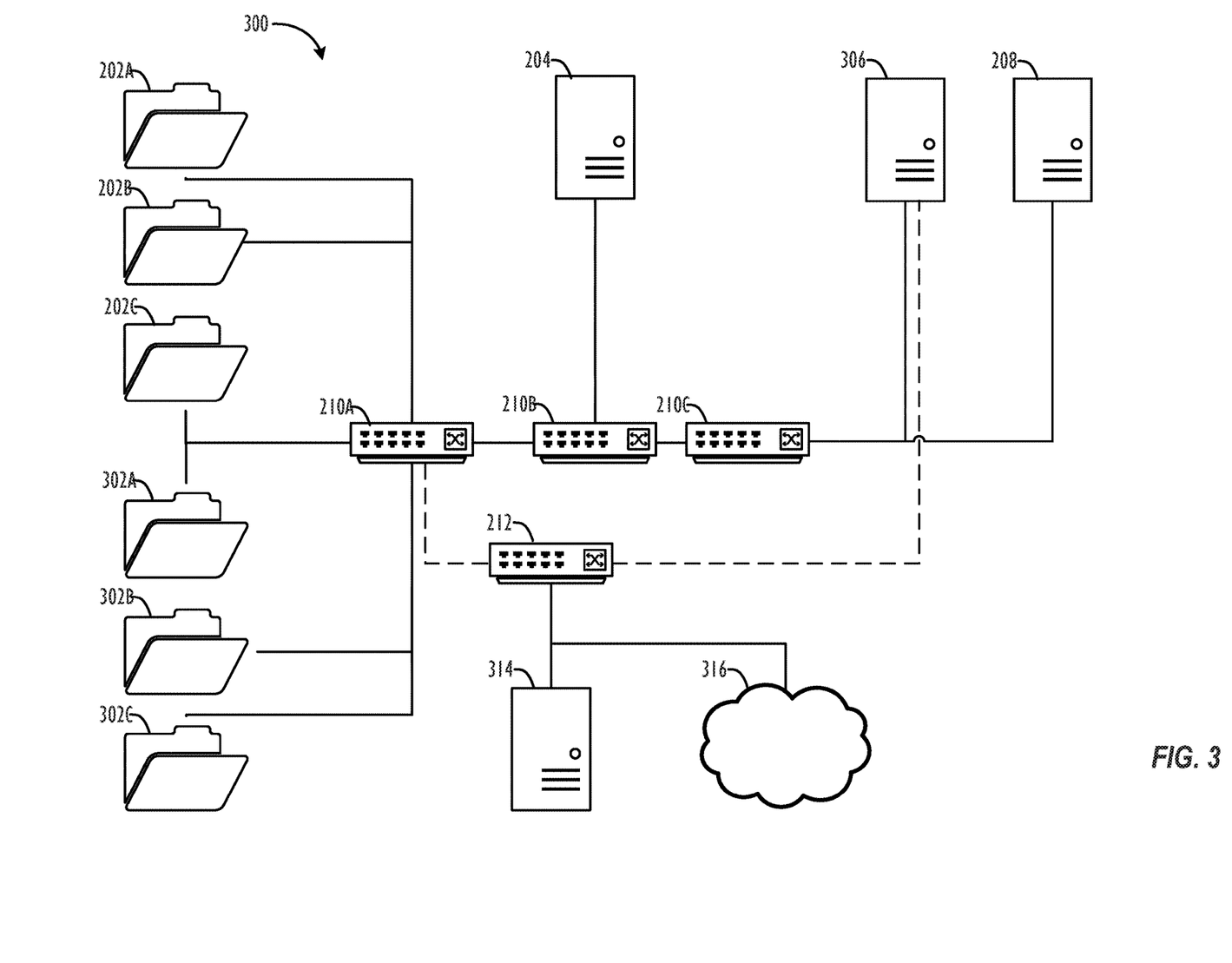
FIG. 3 is a block diagram illustrating an IoT network according to one or more embodiments.

FIG. 3 is a block diagram illustrating another IoT network 300 according to one or more embodiments. FIG. 3 is demonstrative of how IoT networks may change through usage and over time. For improvement of network security, identifying changes in network topology may be important, as nefarious actors may be active on the network. The IoT network 300 in FIG. 3 is the augmented form of the IoT network 200 illustrated in FIG. 2. The IoT network 300 in FIG. 3 remains similar to the IoT network 200 in FIG. 2. Data sources 202A, 202B, 202C are joined by data sources 302A, 302B, 302C. Data sources 302A, 302B, 302C may be of the same or similar types of devices as data sources 202A, 202B, 202C. Similar to FIG. 2, an intermediate server 204 collects data provided by the data sources 202A, 202B, 202C, 302A, 302B, 302C through the switches 210A, 210B. Additionally the user-visible service server 208 from FIG. 2 also exists and maintains the same or similar functionality.

Differing from the network in FIG. 2, an additional intermediate server 306 has joined the network providing a similar functionality as the intermediate server 204. Connected to the redundancy switch is a backup intermediate server 314 and a new cloud-based system 316, representing a backup third party cloud system in this example.

Figure 4:
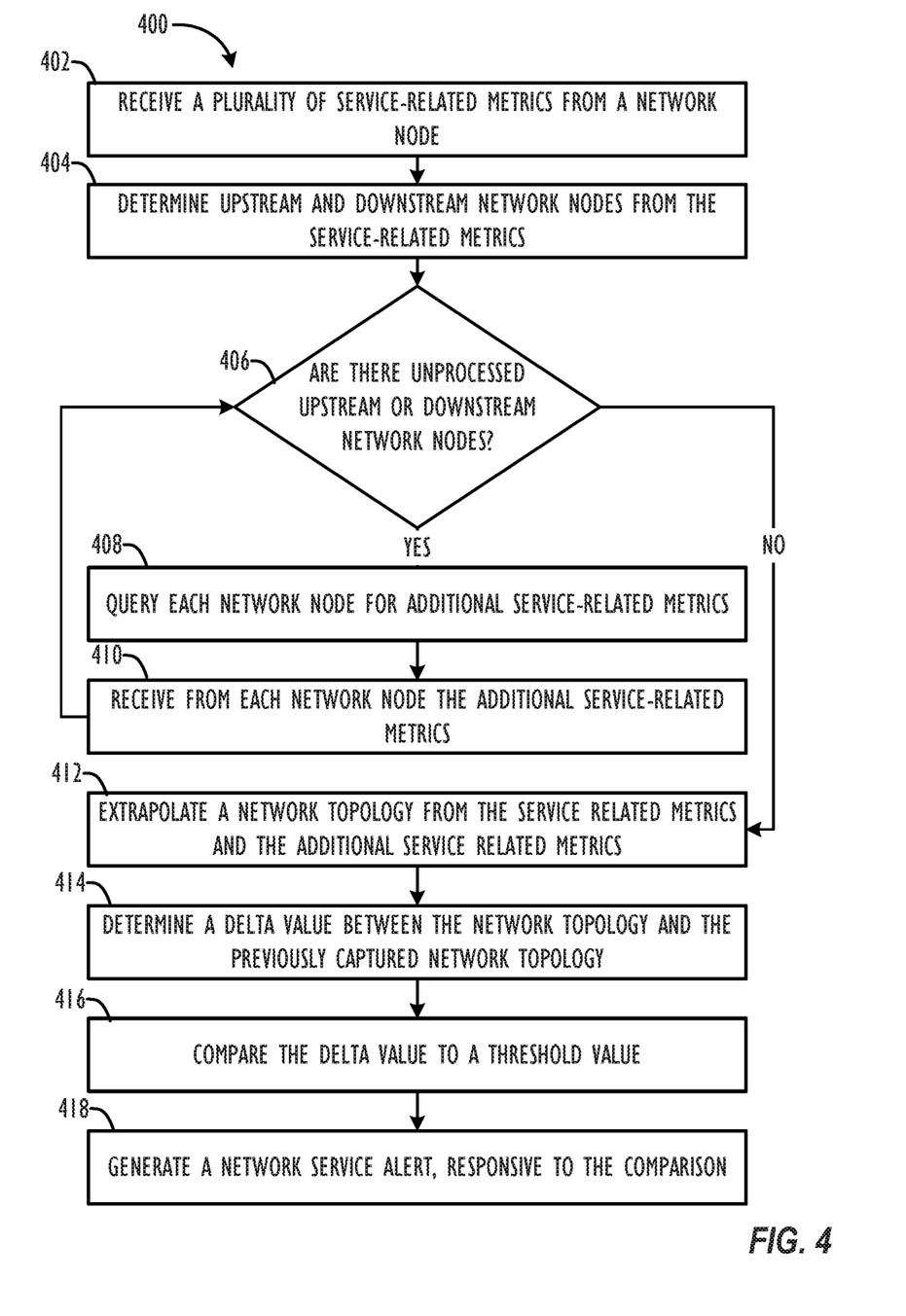
FIG. 4 is a flowchart illustrating a technique for determining critical service delivery points according to one or more embodiments.

FIG. 4 is a flowchart 400 illustrating a technique for determining network security according to one or more embodiments. Augmentation and change of a network over time may be a sign of security issues. Utilizing a known good snapshot of a topology based on services, may be an effective way of detecting network security issues.

At block 402, a plurality of service-related metrics is received from a network node. The service related metrics are received utilizing the software stack 100 presented in FIG. 1. Service-related metrics include data relating to upstream and downstream nodes based on a service.

At block 404, upstream and downstream network nodes are determined from the service-related metrics. Based on the service-related metrics received, the upstream and downstream network nodes may be extracted out of the response messages received.

At block 406, it is determined if any of the upstream or downstream nodes have not been processed. This is depicted as an entry condition for a serial iterative control structure for the determination of additional service related metrics. This may also be processed recursively, as well as in parallel.

Following the affirmative decision branch, at block 408 each network node is queried for additional service-related metrics. This query may take the form of a unicast or multicast request similar to what is described in code example 1.

At block 410, additional service-related metrics are received from each network node, responsive to the request presented at block 408.

Returning to the decision point and following the negative decision branch, at block 412 a network topology is extracted from the cumulative service related metrics. An extrapolated network topology may be consistent with a topology presented in FIG. 3. The network topology may be extrapolated based on parsed and examining the service-related metrics. Network element identifiers may be extracted out of the parsed service-related metrics. Based on the node to which the service-related metrics pertain, a relationship between any network element identifier and the node where the service-related metrics originated may be established. For example, if service-related metrics are retrieved for data source 202A with destination network identifier as intermediate server 204, then a downstream relationship may be established between from the perspective of the data source 202A.

At block 414, a difference is determined between the extrapolated network topology and a previously captured network topology. Alternatively, the extrapolated network topology may be compared against a seeded network topology established or created by a system administrator, where the seeded network topology corresponds to an expected topology defined by the system administrator. Using the topologies from FIGS. 2 and 3, network elements 302A, 302B, 302C, 314, 316, and 306 have been added. Network element 206 was deleted. The addition and removal of these elements may be translated in to a delta value for comparison. The various network element types may be assigned values or weights and based on their addition or removal may increase the delta value. Machine learning techniques may be applicable in determining a delta value based on the network change. In one embodiment, Hidden Markov Models or Bayesian models may be utilized to determine the unseen state changes in a network based on the previously captured network topology and the extrapolated network topology.

At block 416, the delta value is then compared to a predetermined threshold value. The threshold value may be set by a system administrator based on a tolerated amount of network change. The delta value and the threshold establish a rate-of-change in an IoT network or 'network topology dynamicity' which is used by network administrators to determine a network's resilience. For example, if the network behavior was expected to be relatively static, a threshold may be set low. If the network behavior was expected to be relatively dynamic, a high threshold may be configured. Upon the comparison of the delta value against the threshold value, at block 418 a network service alert may be generated. The network service alert may be utilized as an informational prompt for closer network inspection by a system administrator. Based on the network service alert and the rate-of-change, a system administrator may dynamically manage network resilience by the deployment of extra or diminished capacity in the form of discovery, routing and connectivity resources.

Figure 5:
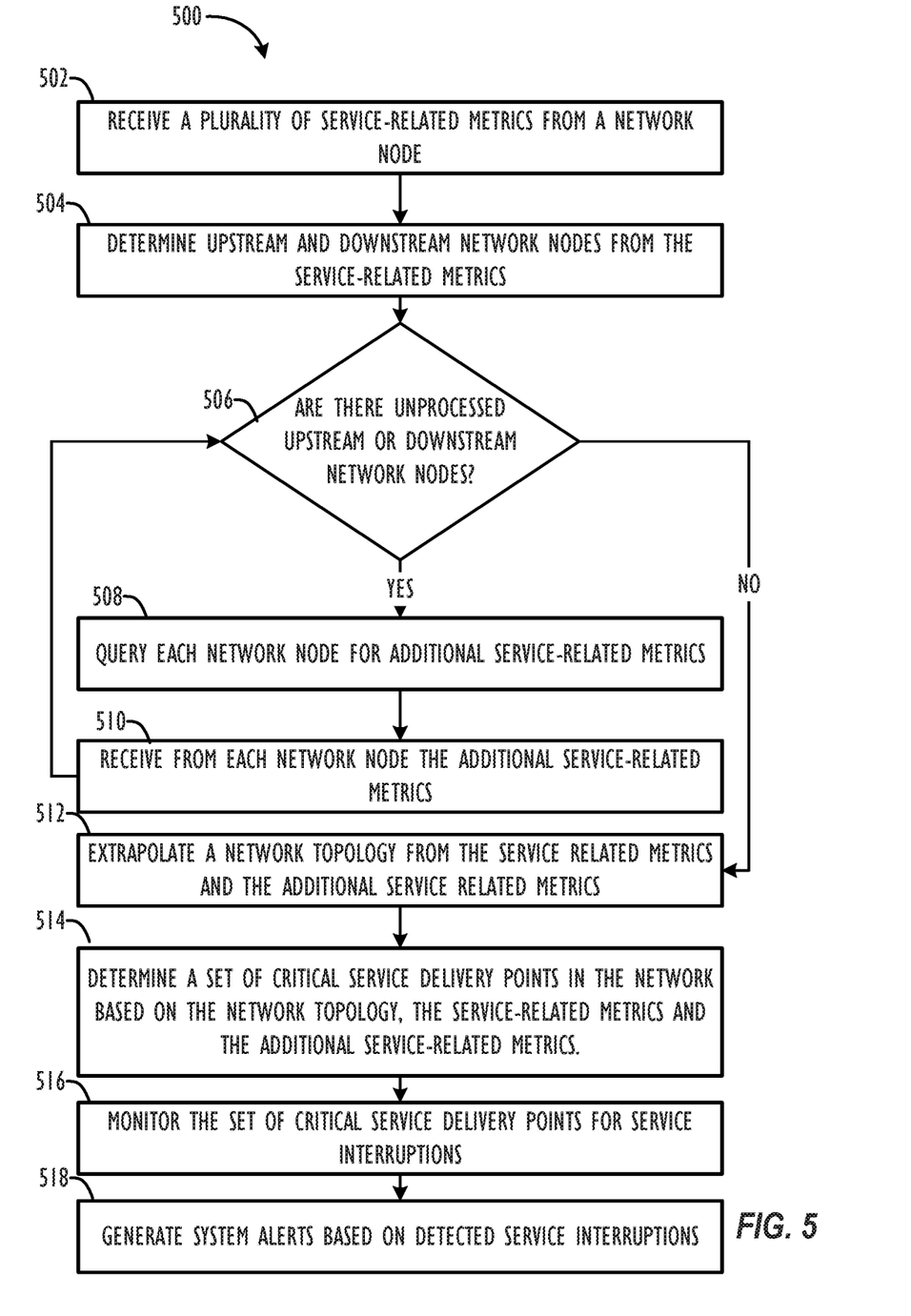
FIG. 5 is a flowchart illustrating a technique for generating a network service alert according to one or more embodiments.

FIG. 5 is a flowchart 500 illustrating a technique for determining critical service delivery points according to one or more embodiments.

At block 502, a plurality of service-related metrics is received from a network node. The service related metrics are received utilizing the software stack 100 presented in FIG. 1. Service-related metrics include data relating to upstream and downstream nodes based on a service.

At block 504, upstream and downstream network nodes are determined from the service-related metrics. Based on the service-related metrics received, the upstream and downstream network nodes may be extracted out of the response messages received.

At block 506, it is determined if any of the upstream or downstream nodes remain unprocessed. This is depicted as an entry condition for a serial iterative control structure for the determination of additional service related metrics. The unprocessed node processing may also be implemented recursively, as well as in parallel.

Following the affirmative decision branch, at block 508 each network node is queried for additional service-related metrics. This query may take the form of a unicast or multicast request similar to what is described in code example 1.

At block 510, additional service-related metrics are received from each network node, responsive to the request presented at block 508 as the entire network is queried node by node.

Returning to the decision point and following the negative decision branch, at block 512 a network topology is extracted from the service related metrics and the additional service related metrics. An extrapolated network topology may be consistent with a topology presented in FIG. 3. The network topology may be extrapolated based on parsing and examining the service-related metrics. Network element identifiers may be extracted out of the parsed service-related metrics. Based on the node to which the service-related metrics pertain, a relationship between any network element identifier and the node where the service-related metrics originated may be established. For example, service-related metrics may be retrieved for data source 202A with destination network identifier as intermediate server 204, then a downstream relationship may be established between from the perspective of the data source 202A.

At block 514, a set of critical service delivery points in the network is determined based on the network topology and the cumulative service-related metrics from all of the network nodes. Critical service delivery points may be determined based on but not limited by examining the data traveling from and to the network nodes, the number of packets in the data, the number of errors in the data, and the volume of data. Utilizing these metrics on a per network node basis will identify network nodes which receive and send large amounts of relevant data to the service, which if disabled or isolated would severely impact the delivery of the service to the user.

Other aspects of the network may be used to determine the set of critical service delivery points in the network. For example, the identification of upstream backup systems such as the backup intermediate server 314 or the new cloud-based system 316 representing a backup third party cloud system, may factor into the determination of the set of critical service delivery points. Where there is built in redundancy or backup, the less likely a service delivery point will be critical.

At block 516, the set of critical service delivery points are monitored for service interruptions. This may be implemented in a number of ways including but not limited by packet inspection on the network, or remote hardware access availability.

At block 518, a system alert may be generated based on the detection of a service interruption. For example, if an intermediary server 204 or the backup intermediate server 314 become unavailable by remote monitoring tools, a system alert may be generated. Likewise, if a packet sniffing tool detects many packet errors in the transmitted and received networking traffic from the intermediary server 204 or the backup intermediate server 314, a system alert may be generated to notify a system administrator.

Figure 6:
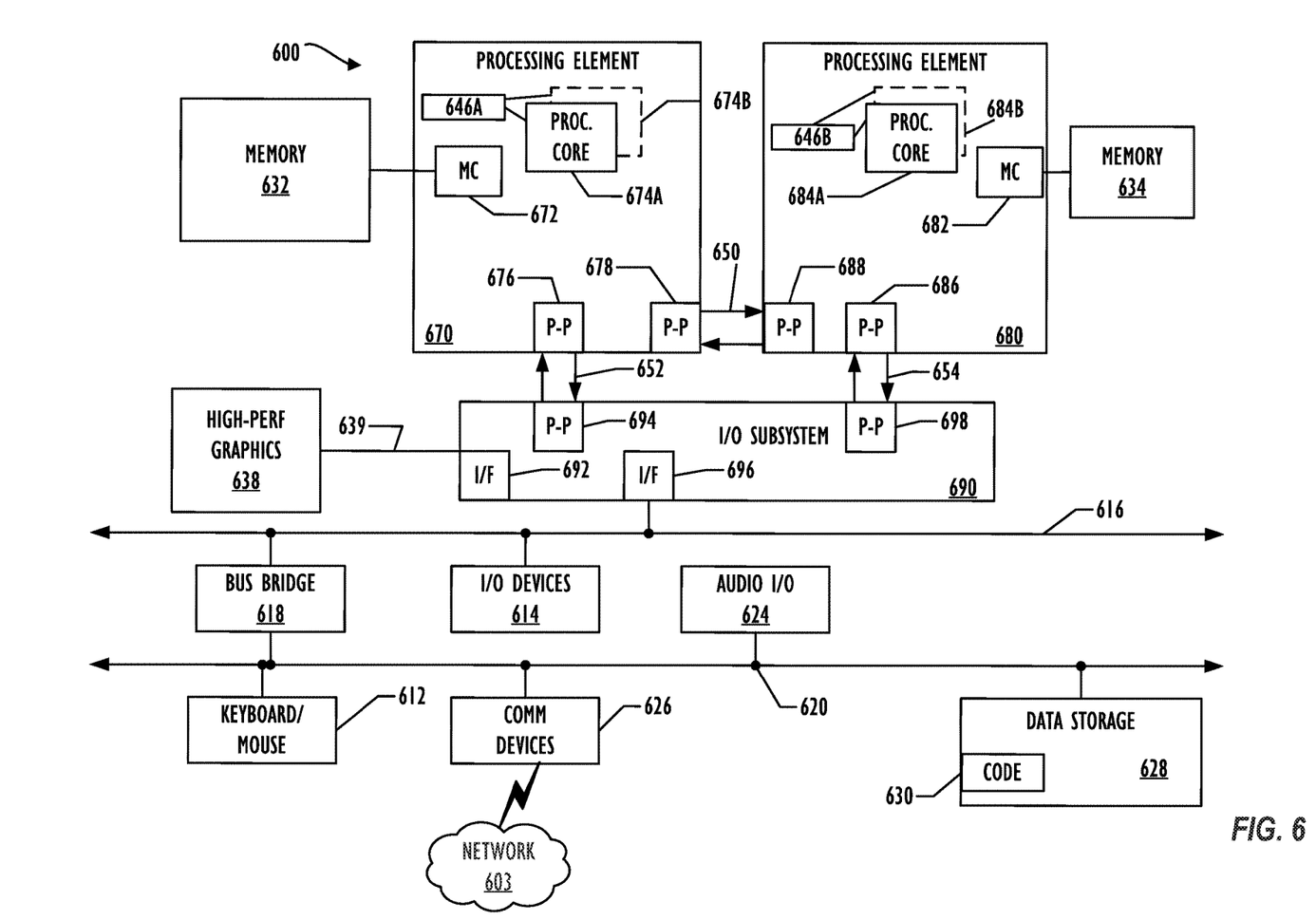
FIG. 6 is a block diagram illustrating a computing device for use with techniques described herein according to one or more embodiments.

Referring now to FIG. 6, a block diagram illustrates a programmable device 600 that may be used for implementing the techniques described herein in accordance with one or more embodiments. The programmable device 600 illustrated in FIG. 6 is a multiprocessor programmable device that includes a first processing element 670 and a second processing element 680. While two processing elements 670 and 680 are shown, an embodiment of programmable device 700 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute computing instruction code. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., computing instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 7:
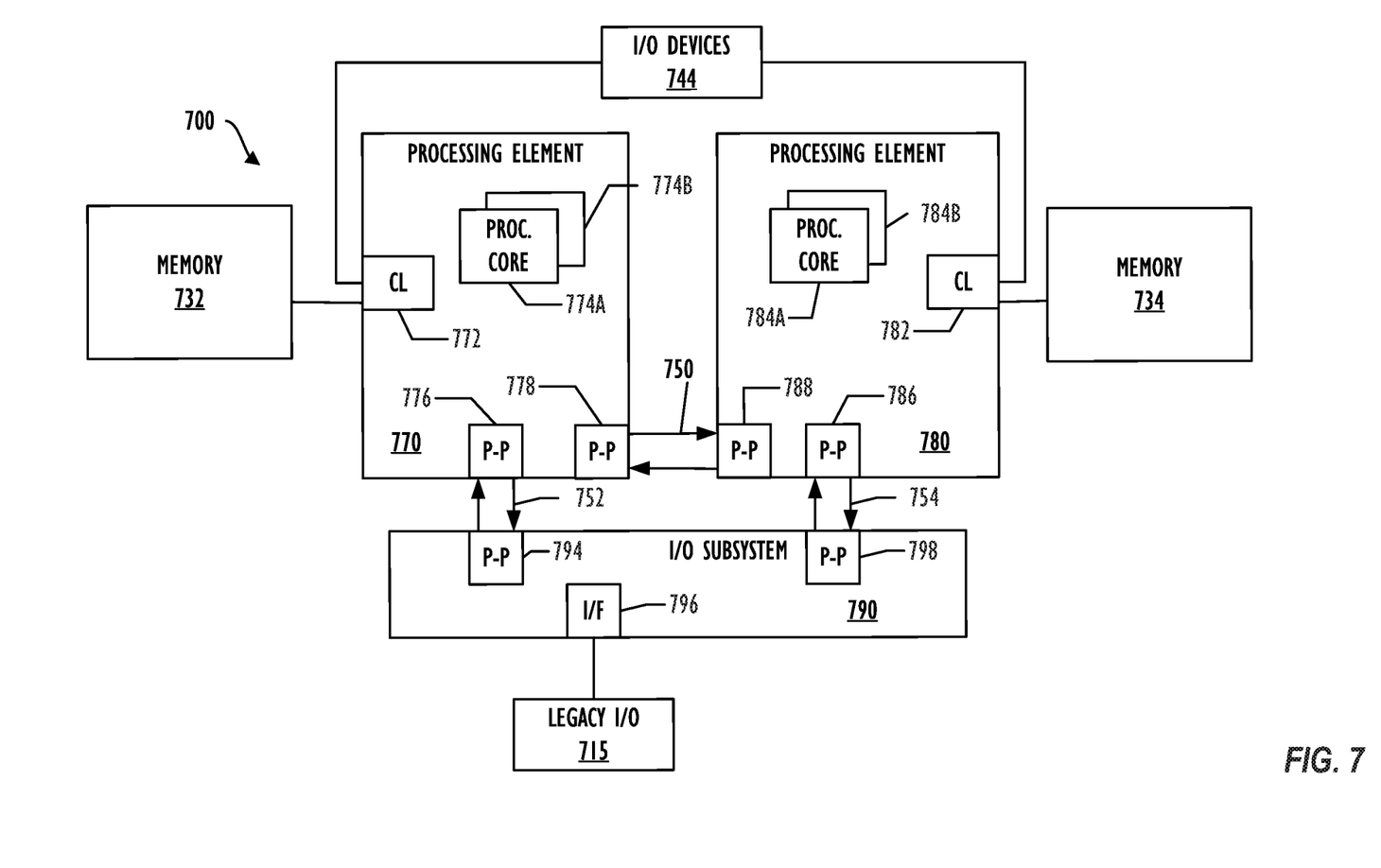
FIG. 7 is a block diagram illustrating a computing device for use with techniques described herein according to one or more embodiments.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 7, MCs 672 and 782 couple processing elements 670, 680 to respective memories, namely a memory 632 and a memory 634, which may be portions of main memory locally attached to the respective processors. While MC logic 672 and 682 is illustrated as integrated into processing elements 670, 780, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 7, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 that may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. In addition, the elements of FIG. 6 may alternatively be partitioned using more or fewer integrated chips than illustrated in FIG. 6.

Referring now to FIG. 7, a block diagram illustrates a programmable device 700 according to another embodiment. Certain aspects of FIG. 7 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A and 784B. As illustrated in FIG. 7, I/O subsystem 790 includes point-to-point (P-P) interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The following examples pertain to further embodiments.

Example 1 is at least one computer readable medium on which is stored software for improving application service delivery in a network, comprising instructions that when executed cause a programmable device to: receive a plurality of service-related metrics from a network node, determine, from the plurality of service-related metrics, upstream network nodes and downstream network nodes; query the upstream network nodes and downstream network nodes for an additional plurality of service-related metrics; receive, from the upstream network nodes and downstream network nodes, an additional plurality of service-related metrics; extrapolate a network topology based on the plurality of service-related metrics and the additional plurality of service-related metrics; determine a delta value between the extrapolated network topology and a previous network topology; compare the delta value to a threshold value; and generate a network service alert, responsive to the comparison.

In Example 2 the subject matter of Example 1 optionally includes wherein the instructions to determine a delta value comprise instructions to determine additional and deleted network nodes from the extrapolated network topology based on the previous network topology.

In Example 3 the subject matter of Example 1 optionally includes wherein the instructions to determine a delta value comprise instructions to apply a machine learning algorithm to the extrapolated network topology and the previous network topology.

In Example 4 the subject matter of Example 3 optionally includes wherein the machine learning algorithm comprises a hidden Markov model.

In Example 5 the subject matter of Example 3 optionally includes wherein the instructions to extrapolate a network topology comprise instructions to extract network topology information from the service-related metrics and the additional plurality of service-related metrics utilizing base stack layer application programming interfaces.

In Example 6 the subject matter of Example 1 optionally includes wherein the previous network topology comprises a seeded network topology.

In Example 7 the subject matter of Examples 1-3 optionally includes wherein the instructions to extrapolate comprises instructions to: parse the plurality of service-related metrics and the additional plurality of service-related metrics; extract a plurality of network element identifiers from the parsed plurality of service-related metrics and additional plurality of service-related metrics; and determine a relationship between each of the extracted plurality of network element identifiers.

Example 8 is a method for improving application service delivery in a network comprising: receiving a plurality of service-related metrics from a network node, determining, from the plurality of service-related metrics, upstream network nodes and downstream network nodes; querying the upstream network nodes and downstream network nodes for an additional plurality of service-related metrics; receiving from the upstream network nodes and downstream network nodes an additional plurality of service-related metrics; and extrapolating a network topology based on the plurality of service-related metrics and the additional plurality of service-related metrics; determining a set of critical service delivery points in the network, based on the network topology, the plurality of service-related metrics, and the additional plurality of service-related metrics; monitor the set of critical service delivery points for the detection of a service interruption; and generate a system alert, responsive to the detection.

In Example 9 the subject matter of Example 8 optionally includes wherein determining the set of critical service delivery points comprises examining data passing through the upstream network nodes and the downstream network nodes.

In Example 10 the subject matter of Example 9 optionally includes wherein examining an amount of data comprises: identifying packets in the data; identifying errors in the data; and identifying volume of the data.

In Example 11 the subject matter of Example 8 optionally includes wherein extrapolating a network topology comprises extracting network topology information from the service-related metrics and the additional plurality of service-related metrics utilizing base layer application programming interfaces.

In Example 12 the subject matter of Examples 8 and 11 optionally includes wherein extrapolating a network topology comprises: parsing the plurality of service-related metrics and the additional plurality of service-related metrics; extracting a plurality of network element identifiers from the parsed plurality of service-related metrics and additional plurality of service-related metrics; and determining relationships between the plurality of network element identifiers.

In Example 13 the subject matter of Examples 8 and 9 optionally includes wherein determining of set of critical service delivery points comprises detecting upstream network node and downstream network node isolation.

Example 14 is a device for improving application service delivery and security in a network comprising: one or more processors; a network adapter, communicatively coupled to the one or more processors; and memory coupled to the one or more processors on which are stored instructions, comprising instructions that when executed cause at least some of the one or more processors to: receive a plurality of service-related metrics from a network node, determine, from the plurality of service-related metrics, upstream network nodes and downstream network nodes; query the upstream network nodes and downstream network nodes for an additional plurality of service-related metrics; receive, from upstream network nodes and downstream network nodes, an additional plurality of service-related metrics; and extrapolate a network topology based on the plurality of service-related metrics and the additional plurality of service-related metrics; compare the network topology to a previous network topology; determine a delta value between the extrapolated network topology and the previous network topology; compare the delta value to a threshold value; and generate a network service alert, responsive to the comparison.

In Example 15 the subject matter of Example 14 optionally includes wherein the instructions to determine a delta value comprise instructions to determine additional and deleted network nodes from the extrapolated network topology based on the previous network topology.

In Example 16 the subject matter of Example 14 optionally includes wherein the instructions to determine a delta value comprise instructions to apply a machine learning algorithm to the extrapolated network topology and the previous network topology.

In Example 17 the subject matter of Example 16 optionally includes wherein the machine learning algorithm comprises a hidden Markov model.

In Example 18 the subject matter of Examples 14-16 optionally includes wherein the instructions to extrapolate a network topology comprise instructions to extract network topology information from the service-related metrics and the additional plurality of service-related metrics utilizing base layer APIs.

In Example 19 the subject matter of Example 14 optionally includes wherein the previous network topology comprises a seeded network topology.

In Example 20 the subject matter of Examples 14-16 optionally includes, wherein the instructions to extrapolate comprise instructions to: parse each of the plurality of service-related metrics and the additional plurality of service-related metrics; extract a plurality of network element identifiers from the parsed plurality of service-related metrics and additional plurality of service-related metrics; and determine a relationship between each of the extracted plurality of network element identifiers.

Example 21 is an apparatus comprising: a processor; and a memory coupled with the processor, on which are stored instructions, comprising instructions that when executed cause the processor to: receive a plurality of service-related metrics from a network node, determine, from the plurality of service-related metrics, upstream network nodes and downstream network nodes; query the upstream network nodes and downstream network nodes for an additional plurality of service-related metrics; receive, from the upstream network nodes and downstream network nodes, an additional plurality of service-related metrics; extrapolate a network topology based on the plurality of service-related metrics and the additional plurality of service-related metrics; determine a delta value between the extrapolated network topology and a previous network topology; compare the delta value to a threshold value; and generate a network service alert, responsive to the comparison.

In Example 22 the subject matter of Example 21 optionally includes wherein the instructions that when executed cause the processor to determine a delta value comprise instructions that when executed cause the processor to determine additional and deleted network nodes from the extrapolated network topology based on the previous network topology.

In Example 23 the subject matter of Example 21 optionally includes wherein the instructions that when executed cause the processor to determine a delta value comprise instructions that when executed cause the processor to apply a machine learning algorithm to the extrapolated network topology and the previous network topology.

In Example 24 the subject matter of Example 23 optionally includes wherein the machine learning algorithm comprises a hidden Markov model.

In Example 25 the subject matter of Examples 21-23 optionally includes wherein the instructions that when executed cause the processor to extrapolate a network topology comprise instructions that when executed cause the processor to extract network topology information from the service-related metrics and the additional plurality of service-related metrics utilizing base stack layer application programming interfaces.

In Example 26 the subject matter of Example 21 optionally includes wherein the previous network topology comprises a seeded network topology.

In Example 27 the subject matter of Examples 21-23 optionally includes wherein the instructions to extrapolate comprises instructions to: parse the plurality of service-related metrics and the additional plurality of service-related metrics; extract a plurality of network element identifiers from the parsed plurality of service-related metrics and additional plurality of service-related metrics; and determine a relationship between each of the extracted plurality of network element identifiers.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one computer readable storage device or storage disk comprising instructions which, when executed, cause a programmable device to at least:
   determine, based on a plurality of service-related metrics from a network node, upstream network nodes and downstream network nodes in a network;
   query the upstream network nodes and the downstream network nodes with a multicast request for an additional plurality of service-related metrics;
   extrapolate a current network topology based on the plurality of service-related metrics and the additional plurality of service-related metrics;
   determine whether or not an upstream backup server is present for the network node;
   determine a set of critical service delivery points in the network based on the determination of the upstream backup server; and
   generate a network service alert responsive to a service interruption from the set of critical service delivery points.

2. The at least one computer readable storage device or storage disk of claim 1, wherein the instructions which, when executed, cause the programmable device to extrapolate the current network topology by extracting network topology information from the service-related metrics and the additional plurality of service-related metrics utilizing base stack layer application programming interfaces.

3. The at least one computer readable storage device or storage disk of claim 1, wherein the instructions which, when executed, cause the programmable device to extrapolate by:
   parsing the plurality of service-related metrics and the additional plurality of service-related metrics;
   extracting a plurality of network element identifiers from the parsed plurality of service-related metrics and the additional plurality of service-related metrics; and
   determining a relationship between each of the extracted plurality of network element identifiers.

4. The at least one computer readable storage device or storage disk of claim 1, wherein the instructions which, when executed cause the programmable device to further determine the set of critical service delivery points in the network based on the network topology, the plurality of service-related metrics, and the additional plurality of service-related metrics, wherein the plurality of service-related metrics includes a first count of packets in data, a second count of errors in the data, and a third count of a volume of the data.

5. The at least one computer readable storage device or storage disk of claim 1, wherein a service delivery point is less critical if there is a built in backup in the upstream backup server.

6. The at least one computer readable storage device or storage disk of claim 1, wherein the network service alert is a first network service alert, and wherein the instructions which, when executed, cause the programmable device to:
compare the current network topology to a previous network topology to identify first network elements that have been added to the network and second network elements have been removed from the network between a time corresponding to the previous network topology and a time corresponding to the extrapolation of the current network topology;
translate the addition of the first network elements and the removal of the second network elements into a delta value; and
generate a second network service alert responsive to the delta value satisfying a threshold.

7. The at least one computer readable storage device or storage disk of claim 6, wherein the instructions which, when executed, cause the programmable device to translate the addition of the first network elements and the removal of the second network elements into the delta value by applying a machine learning algorithm to the current network topology and the previous network topology.

8. A method comprising:
determining, based on a plurality of service-related metrics from a network node and by executing an instruction with a processor, upstream network nodes and downstream network nodes in a network;
querying, by executing an instruction with the processor, the upstream network nodes and the downstream network nodes with a multicast request for an additional plurality of service-related metrics;
extrapolating, by executing an instruction with the processor, a current network topology based on the plurality of service-related metrics and the additional plurality of service-related metrics;
determining, by executing an instruction with the processor, whether or not an upstream backup server is present for the network node;
determining, by executing an instruction with the processor, a set of critical service delivery points in the network based on the determination of the upstream backup server; and
generating, by executing an instruction with the processor, a network service alert responsive to a service interruption from the set of critical service delivery points.

9. The method of claim 8, wherein the extrapolating of the current network topology includes extracting network topology information from the service-related metrics and the additional plurality of service-related metrics utilizing base layer application programming interfaces.

10. The method of claim 8, wherein the extrapolating of the current network topology includes:
parsing the plurality of service-related metrics and the additional plurality of service-related metrics;
extracting a plurality of network element identifiers from the parsed plurality of service-related metrics and the additional plurality of service-related metrics; and
determining relationships between the plurality of network element identifiers.

11. The method of claim 8, wherein the determining of the set of critical service delivery points is further based on the network topology, the plurality of service-related metrics, and the additional plurality of service-related metrics, wherein the plurality of service-related metrics includes a first count of packets in data, a second count of errors in the data, and a third count of a volume of the data.

12. The method of claim 8, wherein a service delivery point is less critical if there is a built in backup in the upstream backup server.

13. The method of claim 8, wherein the network service alert is a first network service alert, and wherein the method includes:
comparing, by executing an instruction with the processor, the current network topology to a previous network topology to identify first network elements that have been added to the network and second network elements have been removed from the network between a time corresponding to the previous network topology and a time corresponding to the extrapolation of the current network topology;
translating, by executing an instruction with the processor, the addition of the first network elements and the removal of the second network elements into a delta value; and
generating, by executing an instruction with the processor, a second alert responsive to the delta value satisfying a threshold.

14. A device for monitoring a network topology, the device comprising:
one or more processors;
a network adapter, communicatively coupled to the one or more processors; and
memory coupled to the one or more processors, the memory including instructions, the instructions, when executed, to cause the one or more processors to at least:
determine, based on a plurality of service-related metrics from a network node, upstream network nodes and downstream network nodes in a network;
query the upstream network nodes and the downstream network nodes for an additional plurality of service-related metrics;
extrapolate a current network topology based on the plurality of service-related metrics and the additional plurality of service-related metrics;
determine whether or not an upstream backup server is present for the network node;
determine a set of critical service delivery points in the network based on the determination of the upstream backup server; and
generate a network service alert responsive to a service interruption from the set of critical service delivery points.

15. The device of claim 14, wherein the one or more processors are to extrapolate the current network topology by extracting network topology information from the service-related metrics and the additional plurality of service-related metrics utilizing base layer application programming interfaces.

16. The device of claim 14, wherein the one or more processors are to extrapolate the current network topology by:
parsing the plurality of service-related metrics and the additional plurality of service-related metrics;

extracting a plurality of network element identifiers from the parsed plurality of service-related metrics and the additional plurality of service-related metrics; and determining a relationship between the plurality of network element identifiers.

17. The device of claim 14, wherein the one or more processors are to further determine the set of critical service delivery points in the network based on the network topology, the plurality of service-related metrics, and the additional plurality of service-related metrics, wherein the plurality of service-related metrics includes a first count of packets in data, a second count of errors in the data, and a third count of a volume of the data.

18. The device of claim 14, wherein a service delivery point is less critical if there is a built in backup in the upstream backup server.

19. The device of claim 14, wherein the network service alert is a first network service alert, and wherein the one or more processors are to:

compare the current network topology to a previous network topology to identify first network elements that have been added to the network and second network elements have been removed from the network between a time corresponding to the previous network topology and a time corresponding to the extrapolation of the current network topology;

translate the addition of the first network elements and the removal of the second network elements into a delta value representing an amount of change between the current network topology and the previous network topology; and generate at least one of a first alert responsive to the service interruption or a second service alert responsive to a comparison of the delta value to a threshold.

20. The device of claim 19, wherein the one or more processors are to determine the delta value by applying a machine learning algorithm to the current network topology and the previous network topology.

\* \* \* \* \*